Jan. 21, 1936.     A. I. MURDOCK     2,028,556
ADJUSTABLE BEARING
Filed April 18, 1933
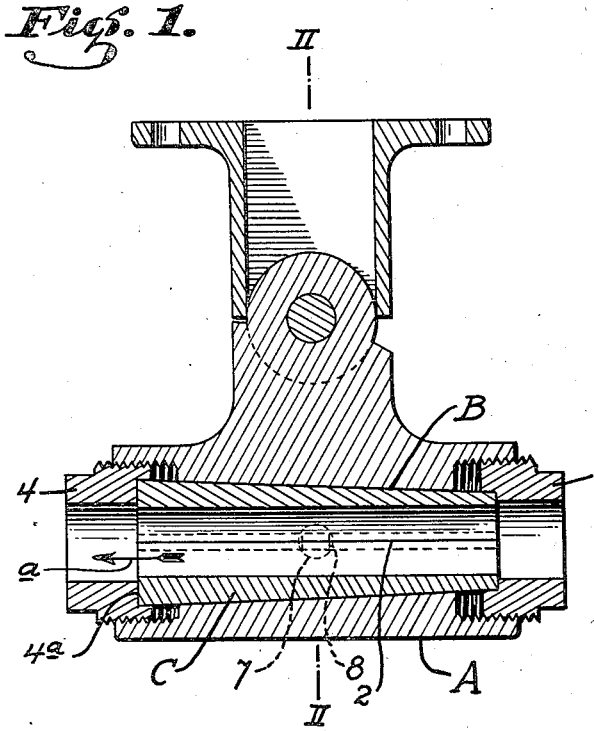
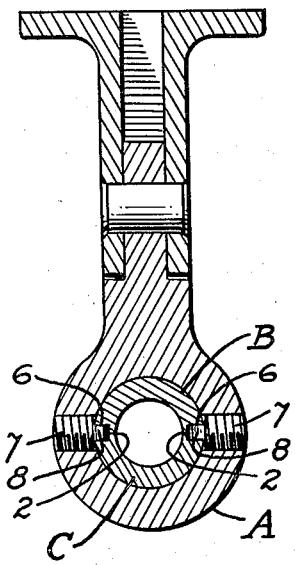
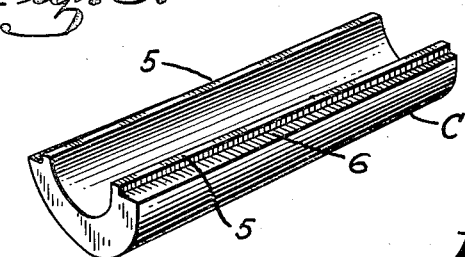
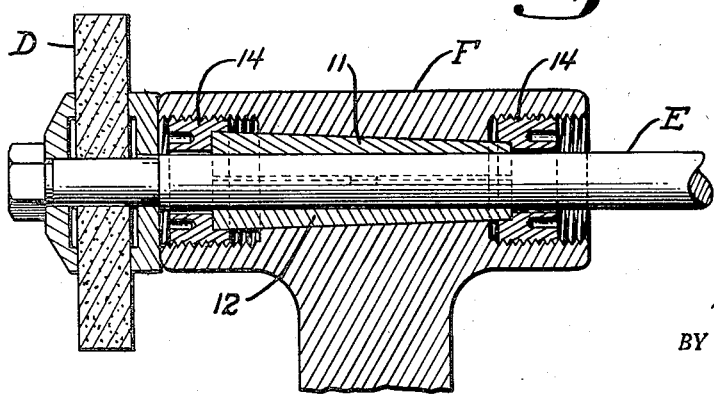
INVENTOR.
Arthur I. Murdock.
BY Townsend & Loftus.
ATTORNEYS.

Patented Jan. 21, 1936

2,028,556

UNITED STATES PATENT OFFICE 2,028,556

ADJUSTABLE BEARING

Arthur I. Murdock, San Francisco, Calif.

Application April 18, 1933, Serial No. 666,647

1 Claim. (Cl. 308—71)

This invention relates to an adjustable bearing and especially to a split bearing bushing and a mounting therefor, whereby wear between a shaft and bushing can be readily taken up without removal of the shaft.

Where a shaft is journaled in a split bearing; that is, a bearing having a main body and a removable cap portion, it is a fairly simple matter to babbitt or bush the bearing and to take up wear from time to time by removal of shims, or the like, placed between the cap and padding. There are, however, a number of instances where a split or two-piece bearing cannot be employed; for instance, in the stern bearings of launches and similar craft, and in other instances. In a launch the stern bearing supports the propeller and shaft. In installations of that character it is accordingly necessary to remove the propeller and pull the shaft out of the stern bearing, or stern strut, and then to re-babbitt or replace the old bushings with new ones. All of which requires not only skilled labor and time, but also considerable cost as the boat must be put in dry dock, hauled up on ways, or at least the stern must be raised to prevent entrance of water when the shaft is removed.

The object of the present invention is to generally improve and simplify the construction and operation of bearings of the character described; to provide a bush bearing in which the bushings are adjusted to take up wear between the bushing and shaft; to provide a bearing in which the bushings may be removed and renewed without pulling or removing the shaft; and further, to provide a bearing of the character described in which all repairs, such as taking up wear, replacing bushings, etc., may be accomplished without the employment of skilled labor and in a comparatively simple manner and short period of time.

The adjustable bearing is shown by way of illustration in the accompanying drawing, in which—

Fig. 1 is a central vertical longitudinal section through the bearing.

Fig. 2 is a cross section taken on line II—II of Fig. 1.

Fig. 3 is a perspective view of one of the bearing bushings.

Fig. 4 is a fragmentary section of one end of a modified form of the bearing.

Referring to the drawing in detail, and particularly Figs. 1 to 3, A indicates a one-piece bearing; that is, a bearing in which removable caps and the like cannot be employed. The bearing is elongated as shown and is cylindrical in cross section. Extending centrally and longitudinally through the bearing is a cone-shaped bore and mounted in said cone-shaped bore are a pair of bushings generally indicated at B and C. The bushing indicated at B will be referred to as the upper bushing and the bushing C as the lower bushing. The bushings are formed in two halves and divided by a line between the bushings as indicated at 2. The bushings are identical in construction and will be described later.

Formed at each end of the main bearing A are enlarged openings which are internally threaded to receive a pair of tubular plugs generally indicated at 3 and 4. These plugs are squared at their outer ends in the manner of a nut to permit a wrench to be applied when they are to be tightened or loosened in the bearings. The inner ends are enlarged to receive the opposite ends of the bearing bushings and the central passages in the plugs are also slightly enlarged so as to provide a clearance for the shaft extending through the bearing and journaled in the bushings B and C.

The bushings proper are best shown in Figs. 1 and 3. They are made in two halves, as previously stated, and each half is identical. The exterior surfaces taper to fit the cone-shaped central passage formed in the bearing A. The dividing faces are provided with ribs 5—5 and these faces are of a width less than the thickness of the metal forming the bushings so as to provide a channel 6 on each side. A set screw 7 is inserted in each side of the main bearing A, and each set screw terminates in a rectangular shaped end 8 which ends enter the channel 6 and which function as keys to prevent rotation of each half bushing section when inserted in the bearing.

In actual practice the bearings A may be made in standard sizes and each size bearing is adapted to receive bushings, such as shown in Fig. 3, which are adapted to receive shafts of various diameters, the exterior dimensions of the bushings for a particular bearing being, however, the same. To begin with the bearing A is machined in any suitable way. The longitudinal bore is tapered and finished and the enlarged ends are threaded to receive the plugs 3 and 4. Before the plugs 3 and 4 are inserted the shaft may be run through the bearing and the bushings B and C are then placed on opposite sides of the shaft and shoved endwise into the bearing. The plug 4 is then inserted and screwed into place, and when so screwed, shoulder 4a engages the large end of the bushings and forces them into the tapering bore of the bearing, thereby forcing them into seating position in the tapering bore of the bearing and into proper engagement with the shaft. The plug 3 may next be applied and engages the opposite end of the bushings, this plug being employed for the purpose of removing the bushings as will later be described. During actual operation wear will obviously take place between the shaft and the inner face of the bushings, and when such wear is to be taken up, it is only necessary to remove the plug 4 and to tighten the plug 3. When this is tightened it forces the bushing halves B and C in the direction of arrow a, and when they have been moved one-sixteenth of an inch or so, they are free and can be slipped out along opposite sides of the shaft. A file or similar tool is then applied to the faces 5 of the respective bushings and this material is removed to take up the wear that has taken place. Plug 3 is now slacked up and the bushings B and C again placed on opposite sides of the shaft and shoved back into the bearing. Nut 4 is then applied and tightened, thus bringing the bearing bushings back into place, the bushings being finally secured by tightening the plug 3.

It will be understood that the bushings are die-cast, or otherwise manufactured, in a shop or factory and can be purchased according to size, hence if the bushings are comparatively new, wear can readily be taken up by merely filing down the faces of the ribs 5 when the bushing sections are removed, but if they are too badly worn a pair of new bushings can be ordered to replace the old. Neither operation requires skilled labor and it can furthermore be seen that the operation is quickly accomplished and at a minimum of time and cost. In most instances it will not even be necessary to remove the boat from the water as the amount of leakage water which would enter around the shaft when the bushings are removed would be comparatively small.

While the bearing has been particularly described in connection with a stern or strut bearing for a boat, or the like, it is obvious that it may be used for any other purposes where a one-piece bearing is desired. For instance, in Fig. 4, the bearing is shown as used in conjunction with an emery wheel, or the like, the emery wheel being indicated at D and the shaft at E. The one-piece bearing is indicated at F and the bearing bushings at 11 and 12. The threaded plugs, indicated at 14, are in this instance screwed within the ends of the bearing proper so that the hub of the wheel D may rub and bear against the end of the bearing without any tendency to frictionally loosen or rotate either of the plugs. A plug, such as shown at 14, can be inserted or removed by means of a socket wrench, while the plug shown at 3 and 4 may be inserted or removed by ordinary wrenches; and while this and other features have been more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

In a device of the character described, a bearing having a tapered bore, said bore being enlarged and interiorly threaded at both ends, a bearing bushing comprising longitudinally separable halves and having an outside surface fitting said tapered bore and an inner bore of uniform diameter to receive a shaft, an exteriorly threaded nut surrounding the shaft and received by one of the threaded ends of the bearing to engage and force the halves of the bearing bushing into the tapered bore until their separable edges abut, a similar nut received by the opposite end of the bearing and engageable with the bushing to eject it from the bearing, said bushing halves being cut away at their exterior surfaces adjacent their separable edges to provide relatively narrow abutting edges and to provide longitudinal channels in the assembled bushing, and keys in the bearing bore projecting into said channels to prevent rotation of the bushing in the bearing.

ARTHUR I. MURDOCK.